March 13, 1956
J. M. ALTENDORF
2,737,872
LAWN EDGE TRIMMERS
Filed March 4, 1953
2 Sheets-Sheet 1
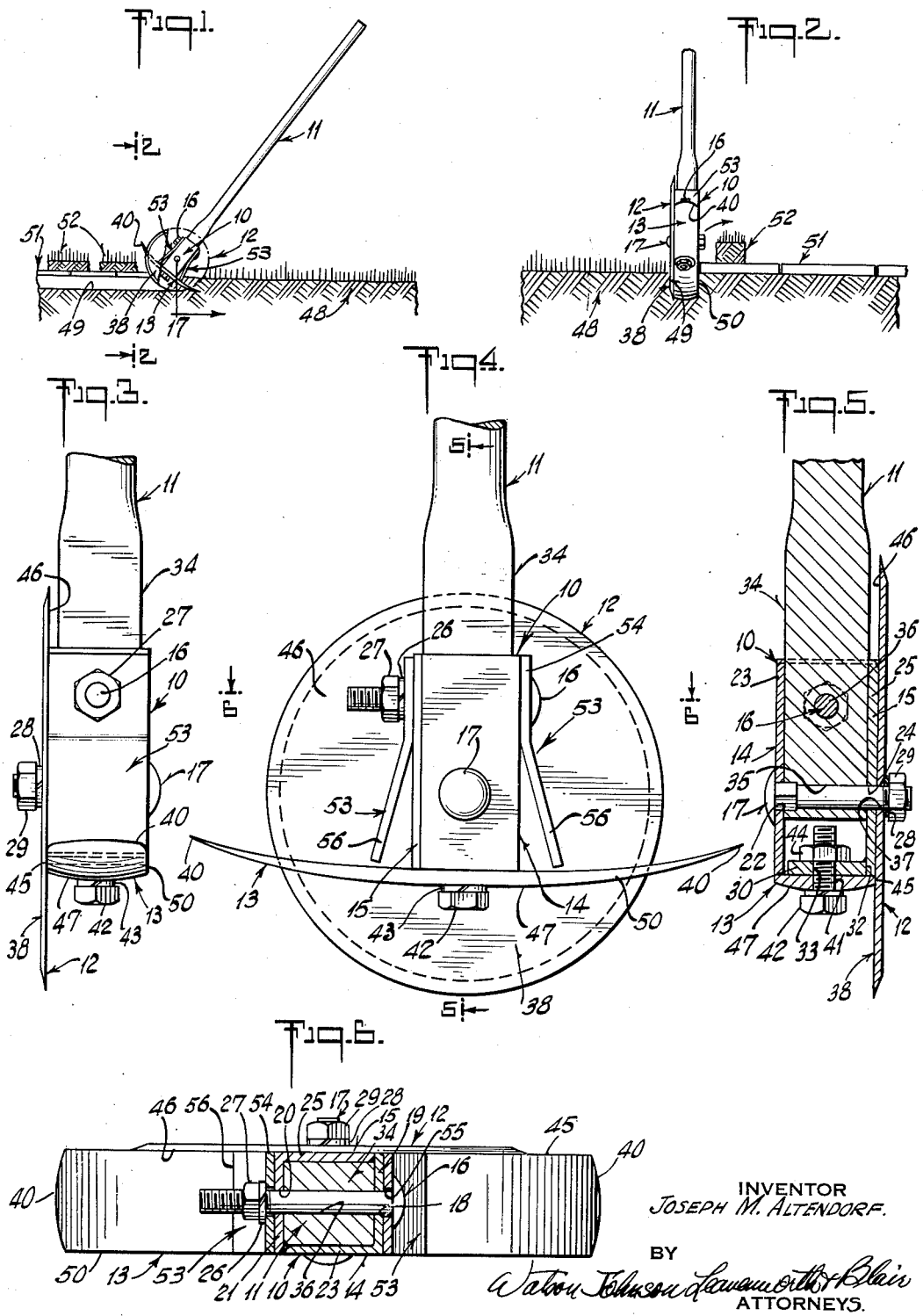
INVENTOR
JOSEPH M. ALTENDORF.
BY
ATTORNEYS.

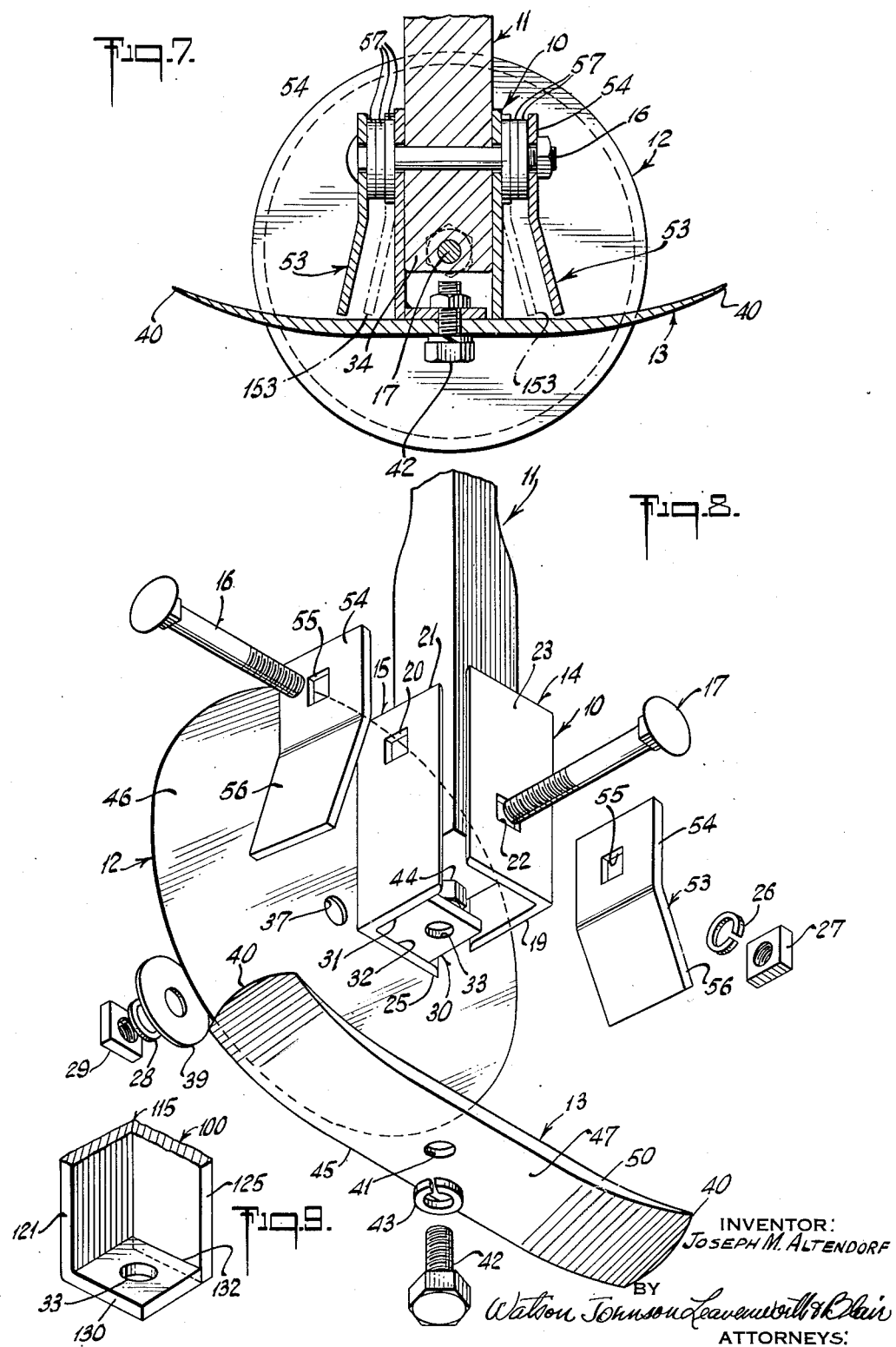

United States Patent Office 2,737,872
Patented Mar. 13, 1956

2,737,872

LAWN EDGE TRIMMERS

Joseph M. Altendorf, Port Washington, Wis.

Application March 4, 1953, Serial No. 340,263

5 Claims. (Cl. 97—227)

The present invention relates to yard implements and, more particularly, to lawn edge or sod trimmers; and the present application is a continuation-in-part of my pending application Serial No. 272,204, filed February 18, 1952 and now abandoned.

General objects of the present invention are to provide such a lawn edge or sod trimmer which is of simple well-balanced construction and readily and economically fabricated and assembled on a mass production basis; is sturdy and durable, being capable of a long service life of severe usage; can be employed to trim sod along both straight and curved lines with ease while working from either the right or left sides; permits clean removal of sod to a uniform predetermined depth as it is cut thereby; allows quick adjustment to vary the depth of furrows; effectively distributes wear over an unusually long sod-severing edge; and permits ready conversion to other types of yard tools with the use of easily applied supplemental attachments.

A more specific object of the present invention is to provide a common operating handle with a sod-severing disk and a lateral double-ended sod-lifting or grubbing element which preferably are removably mounted to the handle and adapted for associated use in an efficient manner.

Another object of the present invention is to provide such a tool with readily adjustable sod-abutting means or stops to limit insertion of the sod-lifting or grubbing element in soil thereby limiting the depth of the furrows to predetermined different values as may be dictated by adjustment of such means.

A further object of the present invention is to provide structural embodiments of the device which are readily constructed and permit efficient use and operation thereof.

Other objects of the invention will in part be obvious and will in part appear hereinafter.

The invention accordingly comprises the features of construction, combination of elements and arrangement of parts, which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

Fig. 1 is a side elevational view, with parts broken away, of an embodiment of the present invention, illustrating use thereof in trimming an edge of a lawn or sodded area and the removal of the cut-away sod;

Fig. 2 is an enlarged edge elevational view, with parts broken away, of the structure shown in Fig. 1;

Fig. 3 is an edge elevational view, with parts broken away, of the device as viewed in Fig. 2, but to a larger scale;

Fig. 4 is a side elevational view, with parts broken away, of the structure shown in Fig. 3;

Fig. 5 is an axial section, with parts in elevation, taken substantially on line 5—5 of Fig. 4;

Fig. 6 is a transverse section taken substantially on line 6—6 of Fig. 4, showing parts in plan;

Fig. 7 is an axial section of a modified form of the device shown in Fig. 4, taken in a plane substantially parallel to the plane of view of the latter figure;

Fig. 8 is an exploded perspective view, with parts broken away, of a modified form of the structure shown in Figs. 3, 4 and 5; and Fig. 9 is a perspective detail of a modified form of part of the handle socket shown in Fig. 8.

Referring to the drawings, in which like numerals identify similar parts throughout, it will be seen from Figs. 1 to 6 inclusive and Fig. 8 that an embodiment of the lawn edge or sod trimmer of the present invention may comprise a socketed body or casing 10 into which is secured a handle 11 and to which is mounted a sod-severing or cutting disk 12 and a double-ended sod-lifting or grubbing element 13. As will best be seen from Figs. 3 to 6 inclusive and Fig. 8, the socketed body or casing 10 may be formed from an opposed pair of sections of angle stock, such as angle iron, 14 and 15, which are to be secured together in such opposed relation by through bolts 16 and 17 arranged substantially normal to each other. The through bolt 16 extends through a hole 18 in the upper portion of the flange 19 of the angle 14 and through an aligned hole 20 in flange 21 of angle 15. The through bolt 17 extends through a hole 22 in the lower portion of the other flange 23 of the angle 14 and through an aligned hole 24 in the other flange 25 of the angle 15. The threaded end of bolt 16 receives a lock washer 26 and a nut 27 while the threaded end of the bolt 17 receives a similar lock washer 28 and nut 29. The bottom of the socket formed by the opposed pair of angles 14 and 15 is closed off in the embodiment illustrated in Figs. 1 to 6 inclusive, and also in that of Fig. 8, by a substantially rectangular plate 30 which may have two adjacent edges thereof secured in any suitable fashion, such as by welding, to the inside faces of the flanges 21 and 25 of the angle 15, such as respectively along the lines 31 and 32. As is best seen in Fig. 8, the bottom plate 30 has a hole 33 extending therethrough for a purpose to be explained later.

As might be seen in Figs. 5 and 6, the handle 11 preferably is provided with a rectangular or square shank 34 which substantially fits into the socket provided by the opposed pair of angles 14 and 15 and the bottom plate 30. Preferably the handle shank 34 has a hole 35 extending therethrough in alignment with the holes 22 and 24 so as to receive therethrough the shank of the bolt 17, and another hole 36 extending substantially at right angles thereto and in substantial alignment with the holes 18 and 20 for reception therethrough of the shank of the bolt 16. With the handle shank 34 socketed in the body 10 provided by the opposed pair of angles 14 and 15, and with the bolts 16 and 17 mounted therethrough as indicated in Figs. 5 and 6, the handle 11 is securely mounted in and fastened to the tool body.

Preferably the bolt 17 also serves to mount to the tool body the sod-severing or cutting disk 12. For this purpose the disk 12 has an axial hole 37 receptive of the shank of the bolt 17 so that the latter may securely hold the disk against one side of the socketed body 10, or, more particularly, against the flange 25 of the angle 15, and in a plane generally parallel to the handle 11. In such face engagement and with the nut 29 tightened up the severing disk 12 may be temporarily held from rotation so that its downwardly-extending, arcuate bottom portion 38 may serve as a sod cutter. However, if desired, the severing disk 12 may be rotatably mounted on the shank of the bolt 17 with the latter serving as an axle when the nut 29 is loosened, and, more particularly, if a washer is interposed between the angle flange 25 and the inside face of the disk 12. Such a washer is illustrated at 39 in Fig. 8 and, although as is indicated there, it may be used on the outside of the disk 12 between the latter and the lock washer 28 and nut 29, the order of those elements may be changed to interpose such washer between the angle flange 25 and the disk 12 with, if desired, omission of the lock washer 28.

The laterally-extending, double-ended, sod-lifting or grubbing element or blade 13 preferably is provided in the form of an elongated strap-like member having opposite ends thereof 40, 40 turned up slightly and the end edges thereof sharpened and disposed generally normal to the longitudinal axis of the blade, as is best seen in Fig. 4, so as readily to enter soil and form a furrow therein. The mid-portion of the blade 13 has a hole 41 extending therethrough to receive the shank of a bolt 42 which is inserted successively through a lock washer 43, hole 41 in blade 13 and a hole 33 in the casing bottom plate 30, to receive above the latter a nut 44. Thus blade 13 may be securely anchored to the bottom of the socketed body 10, but is readily removable either for sharpening or replacement by other types of tool heads. In the forms of the device illustrated in Figs. 1 to 6 incl. and Fig. 8, it may be intended that the sod-cutting disk 12 be held temporarily fixed and thus with no washer interposed between it and angle flange 25, as shown. In such case a side edge 45 of the sod-lifting blade 13 is adapted to be brought substantially to contact of the inside face 46 of disk 12 so as to tend to resist relative sliding motion and more positively prevent disk rotation when it is desired to hold the disk temporarily in fixed position. In that event, the blade 13 serves to back or brace the disk 12 and, more particularly, its sod-cutting arcuate portion 38; with the disk in turn preventing rotation or angular displacement of the blade about bolt 42, so as to maintain its longitudinal axis substantially parallel to a cut formed by the disk. With or without a washer interposed between angle flange 25 and disk 12 the blade edge 45 is juxtaposed to the disk inside face 46.

Further, the bottom side 47 of the blade 13 may also serve as a depth-limiting element in the cutting of the sod with the disk 12 or, more particularly, the arcuate portion 38 of the latter. Thus, the depth of the cut is dependent upon the diameter of the disk 12, the distance between the bottom end of the socketed body 10 and the axis of the disk-mounting bolt 17 and the thickness of the blade 13. However, though the depth of the cut may be altered by using disks and blades respectively of different diameters and thicknesses, it is a simple matter to shim out the blade from the bottom of the socketed body 10 by the use of interposed washers, one or more of which may be employed to vary the depth of the cut as may be desired.

In operation of the embodiments of the device as illustrated in Figs. 1 to 6 inclusive and Fig. 8, the operator may grasp the handle 11 and force the bottom arcuate portion 38 of the disk 12 down into sod, such as that illustrated at 48 in Figs. 1 and 2. In forming that cut in the sod the handle 11 may be held substantially vertical and, should the sod be unusually tough, additional pressure may be applied by stepping on the top of the blade 13 to force the disk portion 38 down into the sod until the blade underside 47 is brought to firm contact with the sod surface. This sod severance may be repeated and continued along a predetermined straight or curved line, as the situation may demand, to form a line of cut 49. As is best seen from Fig. 2, such a line of cut 49 may be dictated by the edge 50 of the blade 13 opposite its edge 45 which is juxtaposed to or contacts the inside face 46 of the disk 12. This blade 50 may be guided along, for example, the edge of a walk 51 or the outside edges of paving stones used in the construction thereof.

After the sod 48 has been severed along the line of cut 49, pieces 52—52 of the trimmed edge may then be lifted and removed with the blade 13 in the manner illustrated in Figs. 1 and 2. If desired, such removal of pieces of sod may be accomplished alternately with step-by-step formation of the line of cut 49, such as by first forming a short cut down through the sod with the exposed arcuate bottom portion 38 of the disk 12 and then lifting out with blade 13 that portion of the sod edge which had been cut away. The double-ended blade 13 permits similar use on both the right and left sides.

It may be desired to employ guard or stop structure to limit depth of insertion of one or both ends of the blade 13, so that the furrow formed by the removal of the sod pieces 52—52 will not tend to be appreciably deeper than the cut 49 formed by the disk 12, thereby assuring a cleanly cut edge for the side of the furrow adjacent the lawn area. This may be accomplished by providing a pair of angular plates 53, 53, which may be substantial duplicates. Each plate 53 preferably has a substantially flat mounting portion 54 provided with a hole 55 through which bolt 17 is received, and an abutment portion 56 which is arranged at an obtuse angle to the portion 54 to extend obliquely across the angle between the longitudinal axis of blade 13 and the axis of the socketed casing 10, as will be noted from Fig. 4. As indicated in Fig. 1, such stop plate 53 will limit the length of the adjacent end 40 of the blade 13 exposed therebeyond that may be inserted into the sod. As is indicated in Fig. 7, the positions of the stop plates 53, 53 may be readily varied or adjusted such as by the use of a plurality of shim washers 57—57 inserted between the socketed body 10 and stop plate attaching portions 54, 54. As a consequence, the positions of the stop plates 53, 53 may be changed to vary the lengths of the portions of the ends 40, 40 of the blade exposed therebeyond. For example, if none of the shim washers 57—57 are employed, the stop plates 53, 53 will occupy positions similar to those indicated in dot-dash lines at 153, 153 in Fig. 7, while with the use of a plurality of such shim washers those plates may occupy the full line positions illustrated therein. Similar intermediate positions of the stop plates 53, 53 may be dictated by the use of a fewer number of shim washers.

As illustrated in Fig. 9, the bottom of the socketed body, such as that indicated at 100, may be provided as an integral portion of one of the flanges of one of the angles, or as stacked integral portions of both of those flanges. For example, angle 115 may have a bottom portion 130 of its angle 121 extended below the bottom edge of the other flange 125 and bent laterally substantially at right angles so as to form the bottom plate. This will avoid the necessity of welding a separate bottom plate to one of the angles; but, of course, an edge of portion 130 may be welded to flange 125, if desired, such as along the line 132. Further, an extension of flange 125 may be bent laterally either to overlay or lap beneath the portion 130 to strengthen the same, with a hole therein aligned with hole 33.

It will thus be seen that the objects set forth above, among those made apparent from the preceding description, are efficiently attained and, since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A sod trimmer comprising, in combination; a casing having a socket therein provided with a closing bottom; an elongated handle having a shank mounted in said socket; a sod-cutting disk removably mounted to one side of said casing and disposed in a plane generally parallel to said handle; a bolt extending transversely through said casing and shank removably mounting said disk to one side of said casing with an arcuate portion of said disk extending appreciably below said bottom; an elongated, substantially rectangular, double-ended, sod-lifting blade having end cutting edges of appreciable width arranged substantially normal to the longitudinal axis of said blade; and another bolt removably attaching said blade substantially medially to said casing bottom in a transverse position, with one side edge of said blade juxtaposed to the inside face of said disk and an arcuate portion of the latter of appreciable depth exposed below said blade, the cutting end edges of said blade extending appreciable distances laterally beyond the edges of said disk.

2. A sod trimmer comprising, in combination; a casing having a socket therein provided with a closing bottom; an elongated handle having a shank mounted in said socket; a sod-cutting disk removably mounted to one side of said casing and disposed in a plane generally parallel to said handle; a bolt extending transversely through said casing and shank removably mounting said disk to one side of said casing with an arcuate portion of said disk extending appreciably below said bottom; an elongated, substantially rectangular, double-ended, sod-lifting blade having end cutting edges of appreciable width arranged substantially normal to the longitudinal axis of said blade; another bolt removably attaching said blade substantially medially to said casing bottom in a transverse position, with one side edge of said blade juxtaposed to the inside face of said disk and an arcuate portion of the latter of appreciable depth exposed below said blade, said blade thereby serving as a cutting depth stop for said disk; another bolt extending through said socketed casing substantially parallel to said blade; and a pair of bent, downwardly-extending, stop plates mounted on opposite sides of said casing by said last-mentioned bolt with each having an oblique lower portion extending across the substantially normal angles between the longitudinal axis of said blade and the upwardly-extending socket axis.

3. A sod trimmer comprising, in combination; an elongated body having a substantially normal bottom end and opposite leading and trailing upwardly-extending sides, said body being provided with an elongated handle extending from the body in a direction away from said bottom end; a double-ended, elongated, sod-lifting blade having longitudinally-spaced transverse ends, laterally-spaced opposite longitudinal side edges, lateral top and bottom faces, and a medial portion between said side edges and said ends mounted in fixed substantially inadjustable position transversely on the bottom end of said body with substantial abutment to the latter of the top face of said blade, whereby the blade ends extend in opposite directions from said opposite leading and trailing sides of said body at angles substantially normal to these body sides, the ends of said blade being substantially like and oppositely-directed with each terminating in a laterally-extending transverse cutting end edge of appreciable width; and a sod-cutting disk mounted at a certain position to and flanking another side of said body intermediate the first two mentioned leading and trailing sides in a plane generally parallel to said handle and also to the longitudinal dimension of said blade with one face of said disk being juxtaposed to one longitudinal side edge of said blade, said disk having a circular cutting edge an arc of which is to serve as a sod-cutting element; the ends of said blade extending in opposite directions appreciable distances beyond the circular cutting edge of said disk to provide the sod-lifting elements thereof and to serve as foot rests for applying sod-cutting pressure to said disk, a segment of the disk of appreciable size extending below the medial portion of said blade to serve as the sod-cutting element with the lateral bottom face of said blade engageable of the sod surface when said disk segment is forced down into sod to limit the depth of cut by said disk.

4. The sod trimmer as defined in claim 3 characterized by depth-dictating sod top-engaging stop means mounted on the opposite first two mentioned sides of said body in the two angles between the latter and the two ends of said blade to define predetermined lengths of the latter extending beyond said stop means for limiting insertion of said blade ends into sod.

5. The sod trimmer as defined in claim 4 characterized by said stop means being in the form of a pair of plates each having a portion extending obliquely substantially across one of said angles.

References Cited in the file of this patent

UNITED STATES PATENTS

| | | |
|---|---|---|
| 168,780 | Porter | Oct. 11, 1875 |
| 620,909 | Gerlach | Mar. 14, 1899 |
| 908,266 | Jackson | Dec. 29, 1908 |
| 1,052,789 | Bergstrom | Feb. 11, 1913 |
| 1,287,840 | Berg | Dec. 17, 1918 |
| 1,892,795 | Wolf | Jan. 3, 1933 |
| 1,916,725 | Harbour et al. | July 4, 1933 |
| 1,964,366 | Schwarz | June 26, 1934 |
| 2,476,461 | Smith | July 19, 1949 |